A. H. PEYCKE.
BRAKE RIGGING ARRANGEMENT.
APPLICATION FILED APR. 22, 1918.
1,339,413.
Patented May 11, 1920.
2 SHEETS—SHEET 2.
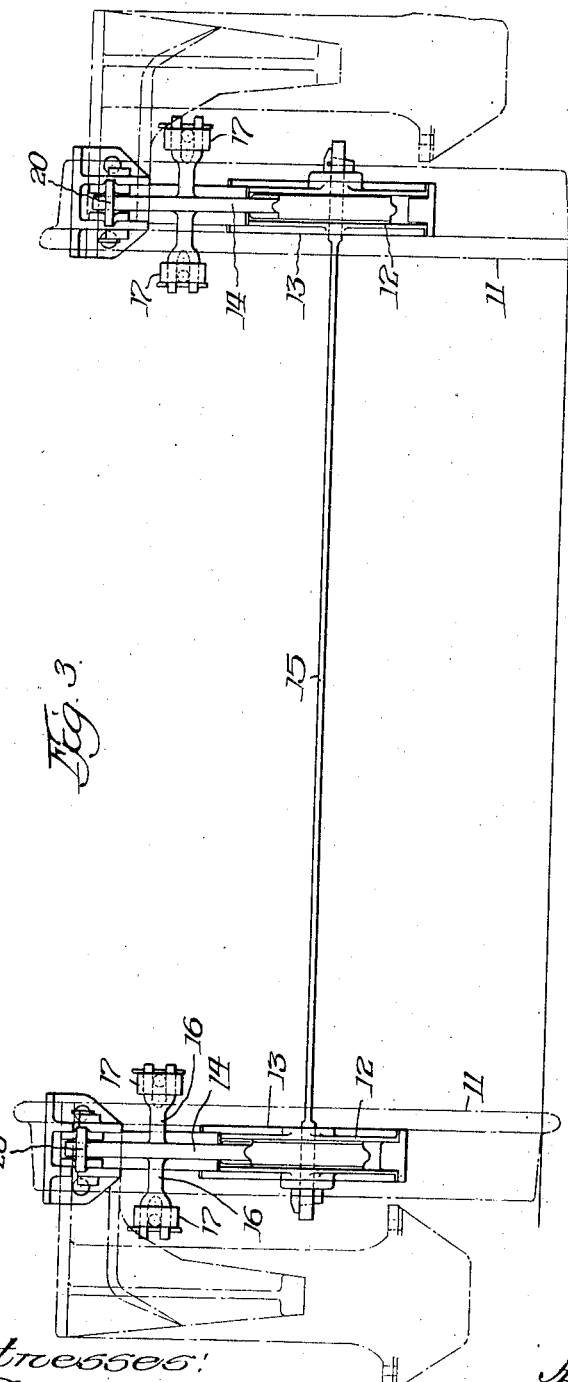
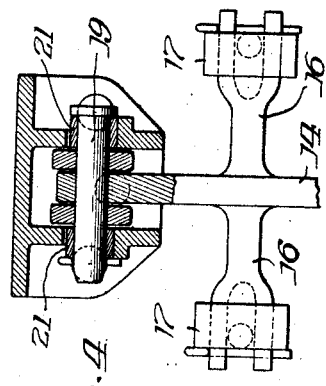
Witnesses:
Geo. C. Rorison
Chas. L. Byron
Inventor
Armand H. Peycke
By Wilkinson & Huxley
Attys.

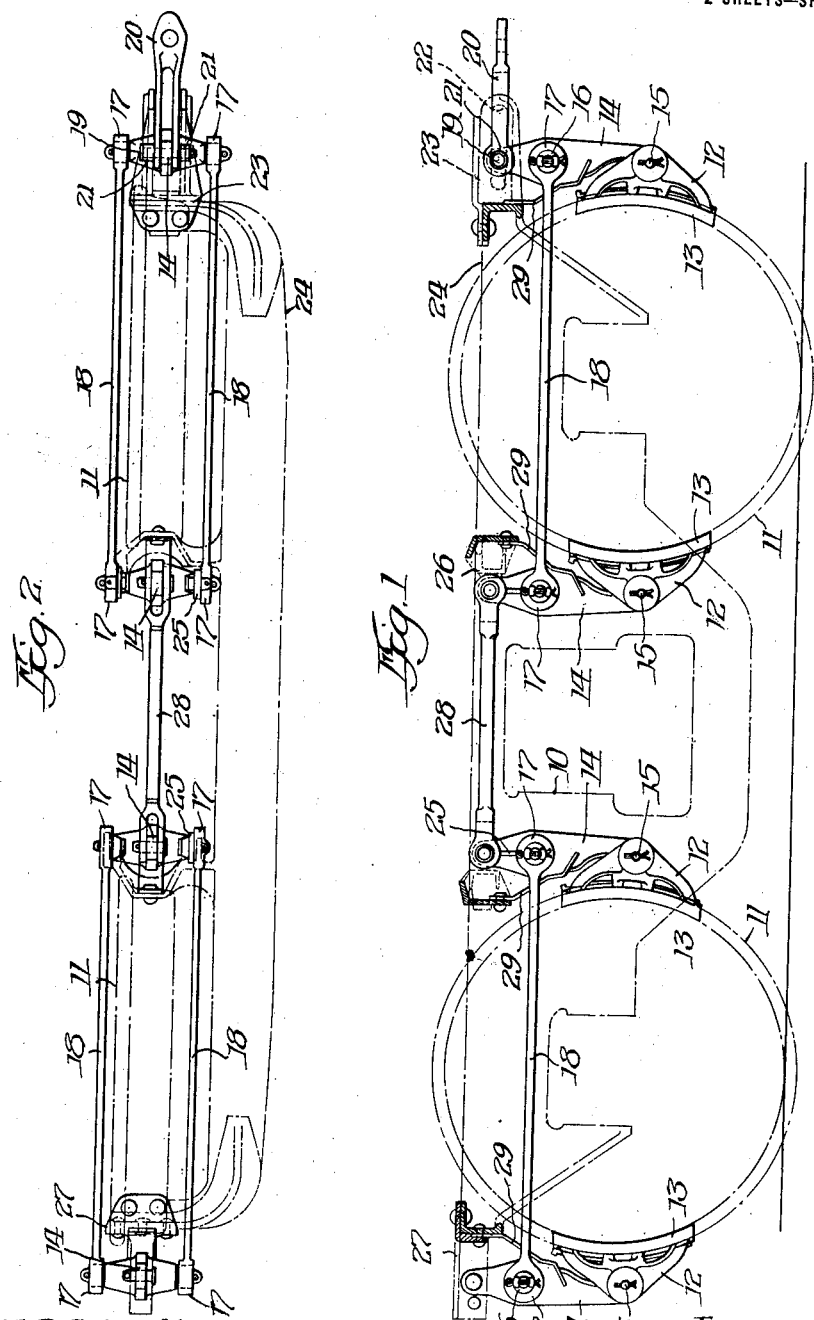

UNITED STATES PATENT OFFICE.

ARMAND H. PEYCKE, OF CHICAGO, ILLINOIS, ASSIGNOR TO AMERICAN STEEL FOUNDRIES, OF CHICAGO, ILLINOIS, A CORPORATION OF NEW JERSEY.

BRAKE-RIGGING ARRANGEMENT.

1,339,413.     Specification of Letters Patent.     Patented May 11, 1920.

Application filed April 22, 1918. Serial No. 229,928.

*To all whom it may concern:*

Be it known that I, ARMAND H. PEYCKE, a citizen of the United States, and resident of Chicago, in the county of Cook and State of Illinois, have invented certain new and useful Improvements in Brake-Rigging Arrangement, of which the following is a specification.

This invention relates to brake riggings to be used particularly in connection with freight cars.

One of the objects of this invention is to simplify the form of brake rigging, to eliminate certain parts, and improve the general coöperating arrangement of the elements.

Another object is to provide an inexpensive freight car clasp brake equipment, adapted to meet the various requirements for successful commercial operation.

These and other objects are accomplished by means of the mechanism disclosed in the accompanying sheets of drawings, in which—

Figure 1 is a fragmentary side elevation of a railway car truck, embodying my improved brake rigging.

Fig. 2 is a fragmentary plan view of the same.

Fig. 3 is a fragmentary end elevation of the same arrangement, and

Fig. 4 is a detail view, parts being in section, of means for supporting the brake lever at the live lever end of the truck.

The various novel features of my invention will be apparent from the following description and drawings and will be particularly pointed out in the appended claims.

Referring to the figures of the drawings, it will be noted that I have shown my invention in connection with a railway car truck 10, supported by wheels 11. The brake mechanism herein shown is of the clasp brake type, wherein the brake heads 12 carrying shoes 13, which coöperate with the braking surface of the wheels 11, are mounted upon opposite sides of each wheel.

In this case each of the brake heads 12 is pivotally connected directly to a brake lever 14, the pivotal connection being formed by the ends of a rod 15, which extends transversely with respect to the car truck and connects the brake heads on opposite sides of the car. It will be noted in this connection that the rod 15 takes the place of a brake beam, the rod acting to hold the brake heads in proper spaced relation at all times. From the arrangement thus far described, it will be noted in this connection that when the brakes are applied the rod in each case, will be in shear at the point of connection with the brake head and that the rod as a whole, will be in tension.

It will be noted that each brake lever is in the form of a cross, having laterally extending arms 16, the ends of which are bifurcated and rounded, whereby eye portions 17 of intermediate pull rods 18 may be slipped over the bifurcated end portions 16. Each intermediate pull rod 18 is pivotally connected to corresponding arms 16 of the associated brake levers 14, there being one pull rod 18 on each side of each wheel, whereby a braking action will be transmitted to produce a direct pull without occasioning torsional strain. The upper end of the brake lever 14 at the live end of the truck is provided with an aperture through which a pin 19 extends. Pivotally connected to this pin 19 is the bifurcated end of a pull rod 20. This pin also is provided with rollers 21 which are adapted to roll in a guideway 22, formed in a bracket 23, which is secured to the truck frame 24 and is in longitudinal alinement with wheels 11. By means of this roller and slotted bracket arrangement the brake lever may easily move in accordance with braking operations and at the same time the bracket forms a support for that end of the brake rigging.

To support the intermediate brake levers 14, hangers 25, which are supported from brackets 26, are pivotally connected to the arms 16 of the associated brake lever. The brake lever 14, at the dead lever end of the truck is pivotally connected to a bracket 27, secured to the truck frame. The end brackets 23 and 27 are swung around to an offset position with respect to the side frame and are arranged in alinement with the coöperating wheels whereby the brake levers are supported in a central position with respect to said wheels.

The top pull rod 28 on each side of the car is the single connection between the intermediate brake levers 14, said rod being pivotally connected to said levers. By means of the hangers 25 for the intermediate levers, the intermediate portion of the brake rigging is sustained in its proper elevated position. Release springs 29, secured to the various brackets adjacent the brake levers, engage said brake levers for transmitting a releasing movement when the braking power has been released. All of the brake levers also are hangers for the brake heads, and all of these hanger levers are floatably mounted except at the dead lever end.

By means of this simple arrangement, brake beams and brake hangers are omitted, thereby decidedly reducing the weight of the rigging and correspondingly reducing the cost thereof. At the same time the brake rigging has its various parts associated in a manner to meet the requirements encountered in service. This type of clasp brake requires no truck end sills.

There may be various modifications of my invention, and it is my intention to cover all such modifications, which do not involve a departure from the spirit and scope of the following claims.

I claim:

1. In brake mechanism, a brake lever operatively associated with a wheel and having oppositely extending arms, pull rods connected to said arms and extending on opposite sides of the associated wheel, and bracket means for guidably supporting said lever.

2. In brake mechanism, a brake lever having oppositely extending arms, pull rods connected to said arms and being arranged on opposite sides of a wheel, hangers connected to said arms for supporting the brake lever, and other means for guidably supporting said brake lever.

Signed at Chicago, Ill., this 11th day of April, 1918.

ARMAND H. PEYCKE.

Witnesses:
CHAS. L. BYRON,
C. M. OBERBECK.